United States Patent [19]
Seo

[11] Patent Number: 6,111,668
[45] Date of Patent: Aug. 29, 2000

[54] SCANNER

[75] Inventor: Shuzo Seo, Saitama, Japan

[73] Assignee: Asahi Kogaku Kogyo Kabushiki Kaisha, Tokyo, Japan

[21] Appl. No.: 09/065,436

[22] Filed: Apr. 24, 1998

[30] Foreign Application Priority Data

Apr. 24, 1997 [JP] Japan ..................................... 9-107128

[51] Int. Cl.⁷ .................................................... H04N 1/04
[52] U.S. Cl. ......................... 358/496; 358/487; 358/474; 358/475
[58] Field of Search ..................................... 358/487, 475, 358/496, 498, 506, 474; 250/235, 559.06, 234; 382/312

[56] References Cited

U.S. PATENT DOCUMENTS

| | | | |
|---|---|---|---|
| 5,392,100 | 2/1995 | Yoshida | 399/211 |
| 5,463,217 | 10/1995 | Sobol et al. | 250/234 |
| 5,710,425 | 1/1998 | McConica et al. | 250/234 |
| 5,798,849 | 8/1998 | Tsai | 358/475 |
| 5,822,087 | 10/1998 | Tsai | 358/475 |
| 5,895,914 | 4/1999 | Tsai | 250/234 |

*Primary Examiner*—Cheukfan Lee
*Attorney, Agent, or Firm*—Greenblum & Bernstein, P.L.C.

[57] ABSTRACT

A scanner is provided which can read information of the whole face of a transmission type reading object by using only a linear-illumination light source for illuminating a reflection type reading object. The scanner has: conveying mechanisms which convey the reflection type reading object and the transmission type reading object between a body case and a cover case in a predetermined direction; an illumination system which is disposed in the body case, which emits the illumination light toward the reflection type reading object, and which forms a linear illuminated portion on the reflection type reading object, the linear illuminated portion linearly elongating in a direction perpendicular to the conveying direction; an illumination light guide plate which is disposed in the cover case, and which guides the illumination light to form a linear illuminated portion on the transmission type reading object; and an image receiving system which is disposed in the body case, and which receives images of the linear illuminated portions of the read objects.

17 Claims, 4 Drawing Sheets

SCANNER

BACKGROUND OF THE INVENTION

The invention relates to a scanner which is used for a reflection type reading object from which information is read on the basis of reflection of illumination light, and a transmission type reading object from which information is read on the basis of transmission of illumination light.

A scanner is known which is used for both a reflection type reading object (for example, a color print) from which information is read on the basis of reflection of illumination light, and a transmission type reading object (for example, a 35-mm negative film) from which information is read on the basis of transmission of illumination light.

Such scanner comprises a body case and a cover case, and an information reading unit is disposed in the body case. The information reading unit is configured by: an illumination system which has a linear-illumination light source, and which emits illumination light toward a reflection type reading object to form a linear illuminated portion on the reflection type reading object; and an image receiving system which receives an image of reflected light from the linear illuminated portion of the reflection type read object. The information reading unit conducts a scanning operation in the body case in a scanning direction perpendicular to the linear illuminated portion. As a result of the scanning operation, information of the whole face of the reflection type reading object is read.

In the cover case, fluorescent lamps which elongate in a direction perpendicular to the scanning direction are arranged at predetermined intervals in the scanning direction. When information of a transmission type reading object is to be read, the linear-illumination light source of the reading unit is turned off, and the fluorescent lamps in the cover case are turned on so as to illuminate the transmission type reading object with the illumination light. The reading unit then conducts a scanning operation in the scanning direction, and information of the whole face of the transmission type reading object is read on the basis of illumination light which passes through the transmission type reading object.

In the scanner, the linear-illumination light source dedicated to illumination of a reflection type reading object, and the fluorescent lamps serving as the light source dedicated to illumination of a transmission type reading object must be separately disposed. Furthermore, the illumination system must be configured so as to prevent the amount of illumination light due to the fluorescent lamps from being unevenly distributed. As a result, there arises a problem in that the whole size of the scanner is increased.

SUMMARY OF THE INVENTION

The invention has been conducted in view of the above-mentioned circumstances. It is an object of the invention to provide a scanner which can read information of the whole face of a transmission type reading object by using only a linear-illumination light source for illuminating a reflection type reading object. According to a first aspect of the present invention, a scanner is provided which includes a body case and a cover case, and which is used for a reflection type reading object from which information is read on the basis of reflection of illumination light, and a transmission type reading object from which information is read on the basis of transmission of the illumination light.

The scanner further includes: a conveying mechanism which conveys the reflection type reading object and the transmission type reading object between the body case and the cover case in a predetermined direction; an illumination system which is disposed in the body case, which emits the illumination light toward the reflection type reading object, and which forms a linear illuminated portion on the reflection type reading object, the linear illuminated portion linearly elongating in a direction perpendicular to the conveying direction; an illumination light guide plate which is disposed in the cover case, and which guides the illumination light to form a linear illuminated portion on the transmission type reading object; and an image receiving system which is disposed in the body case, and which receives images of the linear illuminated portions of the read objects.

According to a second aspect of the present invention, a scanner is provided that is constructed is structured so that the illumination light guide plate is configured by: an entrance portion for the illumination light emitted from the illumination system; an emission portion which is disposed with being separated from the entrance portion in the conveying direction, and which emits the illumination light toward the transmission type reading object; and a light guide portion through which the entrance portion is optically connected to the emission portion. The entrance portion has a pair of entrance ports which are separated from each other in the direction perpendicular to the conveying direction and respectively positioned on both sides of the transmission type reading object, and the emission portion has an emission port which elongates in the direction perpendicular to the conveying direction and across the transmission type reading object.

Preferably, the illumination light guide plate has a Y-like shape in a plan view, and a diffusing face is disposed in the emission port. It is more preferable to configure the scanner so that the illumination light guide plate propagates incident light entering through the entrance ports, to the emission port in accordance with the law of total reflection, because the illumination light can be guided without producing a loss in the amount of light.

The present disclosure relates to the subject matter contained in Japanese Patent Application No. 9-107128 filed on Apr. 24, 1997 which is expressly incorporated herein by reference in its entirety.

DETAILED DESCRIPTION OF THE PREFERRED EMBODIMENT

Figure 1:
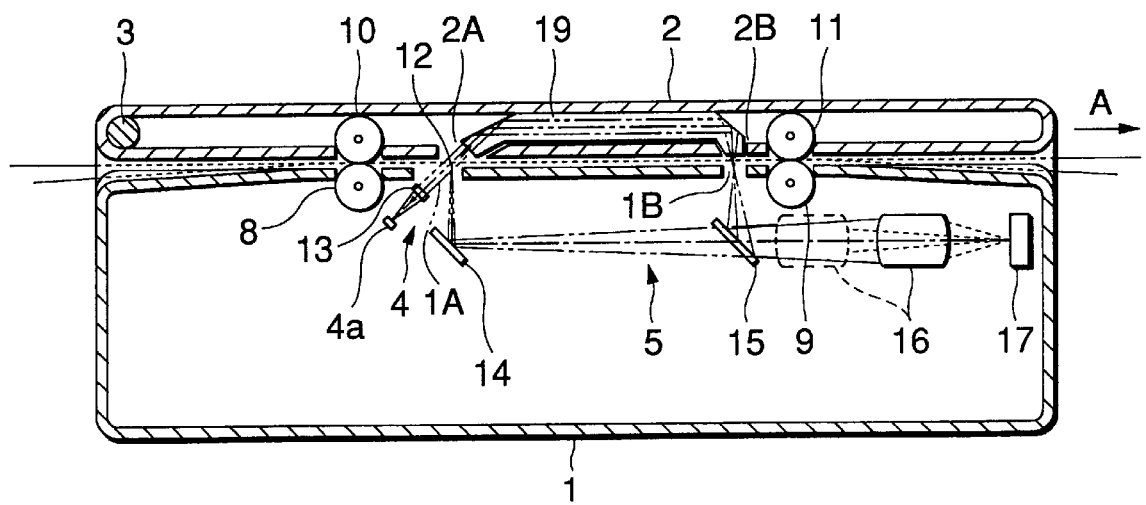
FIG. 1 is a section view showing the configuration of main portions of the scanner of the invention.

In FIG. 1, 1 designates a body case, and 2 designates a cover case. The cover case 2 is attached to the body case 1 so as to be openable about a shaft 3. In the body case 1, an illumination system 4, an image receiving system 5, and various electric circuit components (not shown) are disposed. A pair of driving rollers 8 and 9 serving as a conveying mechanism for conveying a reflection type reading object 6 and a transmission type reading object 7 in a predetermined direction are disposed on the upper face of the body case 1 and separated from each other by a fixed distance. The conveying mechanism conveys either of the refection type reading object 6 and the transmission type reading object 7 so that it is placed on and moved along a predetermined surface defined between the body case 1 and the cover plate 2. The paired driving rollers 8 and 9 are rotated by a driving mechanism (not shown) disposed in the body case 1. A pair of driven rollers 10 and 11 are disposed in the cover case 2 so as to be respectively opposed to the paired driving rollers 8 and 9. The reference numerals 8A and 9A designate rotating shafts of the rollers 8 and 9, respectively.

For example, the reflection type reading object 6 is a color print, and the transmission type reading object 7 is a 35-mm negative film. The width of the transmission type reading object 7 is smaller than that of the reflection type reading object 6. Each of the reading objects 6 and 7 is placed between the body case 1 and the cover case 2, and then conveyed by the pairs of the driving rollers 8 and 9 and the driven rollers 10 and 11, with the reading objects 6 and 7 having their longitudinal direction as the conveying direction, or in the direction of the arrow A.

Slit openings 1A and 1B are formed in the body case 1 with being separated from each other in the conveying direction. Slit openings 2A and 2B are formed in the cover case 2 so as to respectively correspond to the slit openings 1A and 1B. The slit openings 1A, 1B, 2A, and 2B elongate in a direction perpendicular to the conveying direction.

The illumination system 4 functions to illuminate the reflection type reading object 6 with illumination light P, and also to, via the slit opening 1A, form a linear illuminated portion 12 on the reflection type reading object 6. The linear illuminated portion linearly elongates in the direction perpendicular to the conveying direction. The illumination system 4 comprises plural chip LEDs 4a which are arranged at predetermined intervals in the direction perpendicular to the conveying direction, and a cylindrical lens 13 which elongates in the arrangement direction of the chip LEDs 4a. The cylindrical lens 13 converges the illumination light P emitted from the chip LEDs 4a to convert the light into parallel beams.

Figure 2:
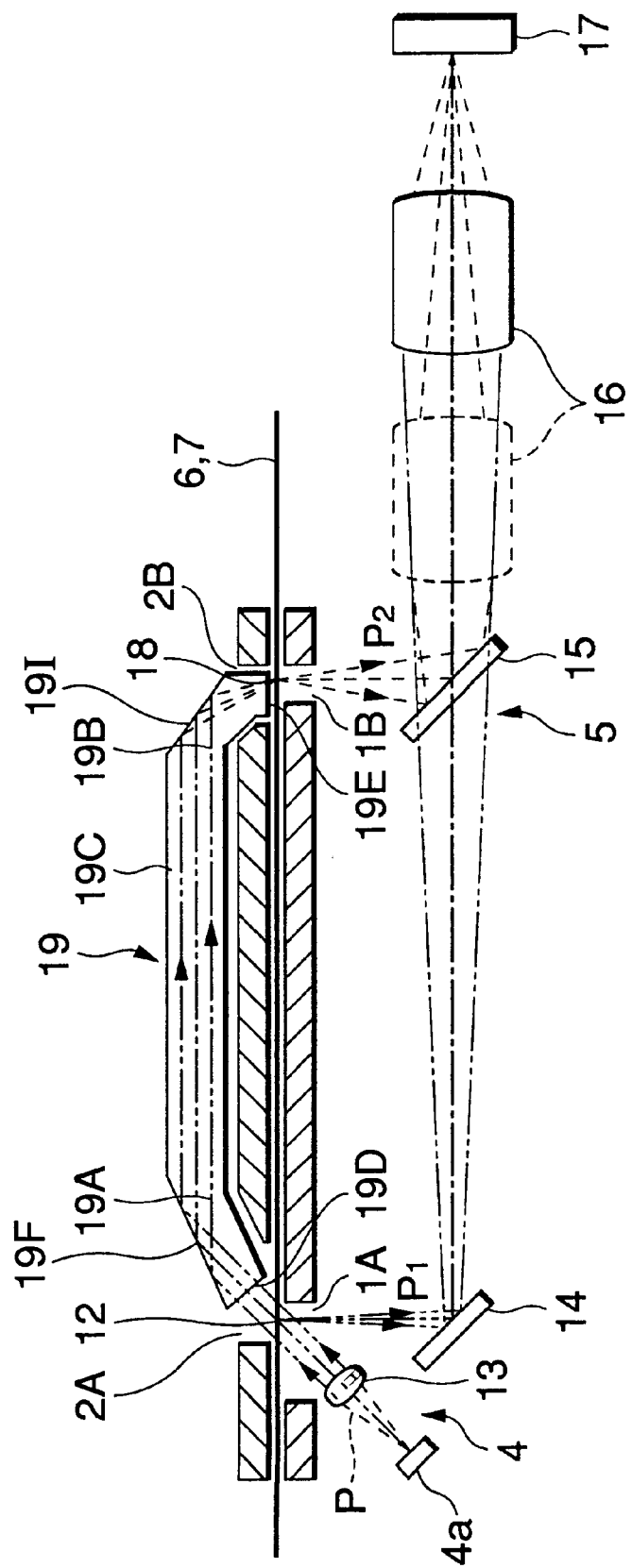
FIG. 2 is an enlarged partial view of an illumination optical system and an image receiving system shown in FIG. 1.

As enlargedly shown in FIG. 2, the image receiving system 5 comprises a total reflection mirror 14, a half mirror 15, an imaging lens 16, and a one-dimensional line sensor (CCD) 17. The total reflection mirror 14, the half mirror 15, and the one-dimensional line sensor 17 elongate in the direction along which the linear illuminated portion 12 elongates.

Figure 3:
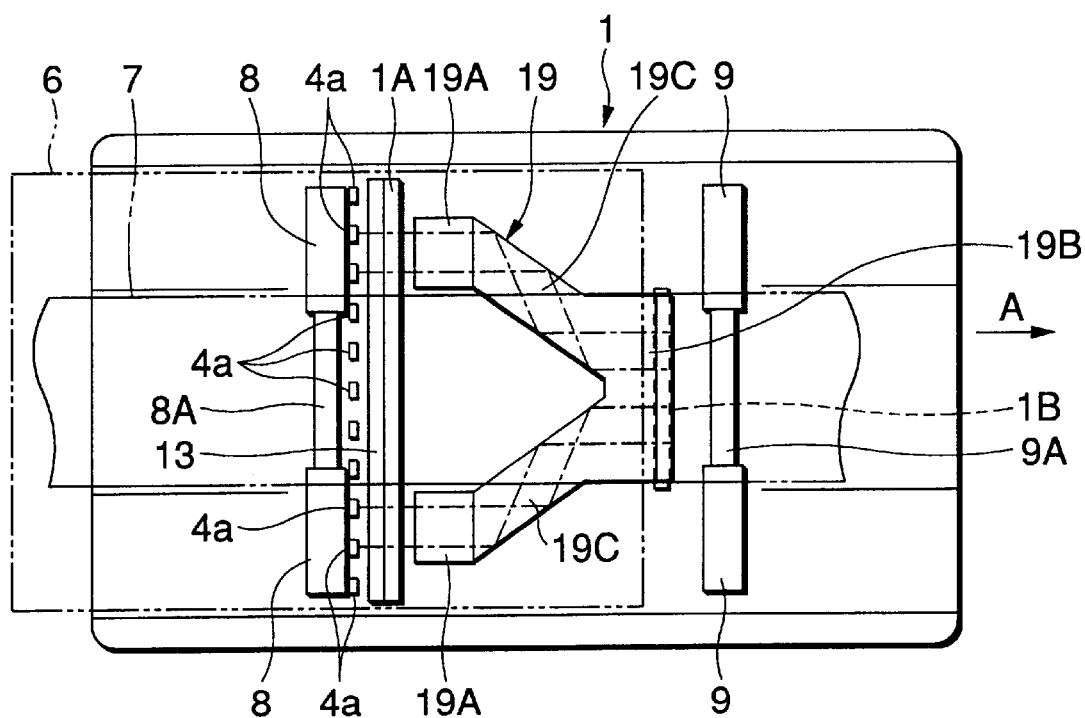
FIG. 3 is a plan view of the scanner shown in FIG. 1.
Figure 4:
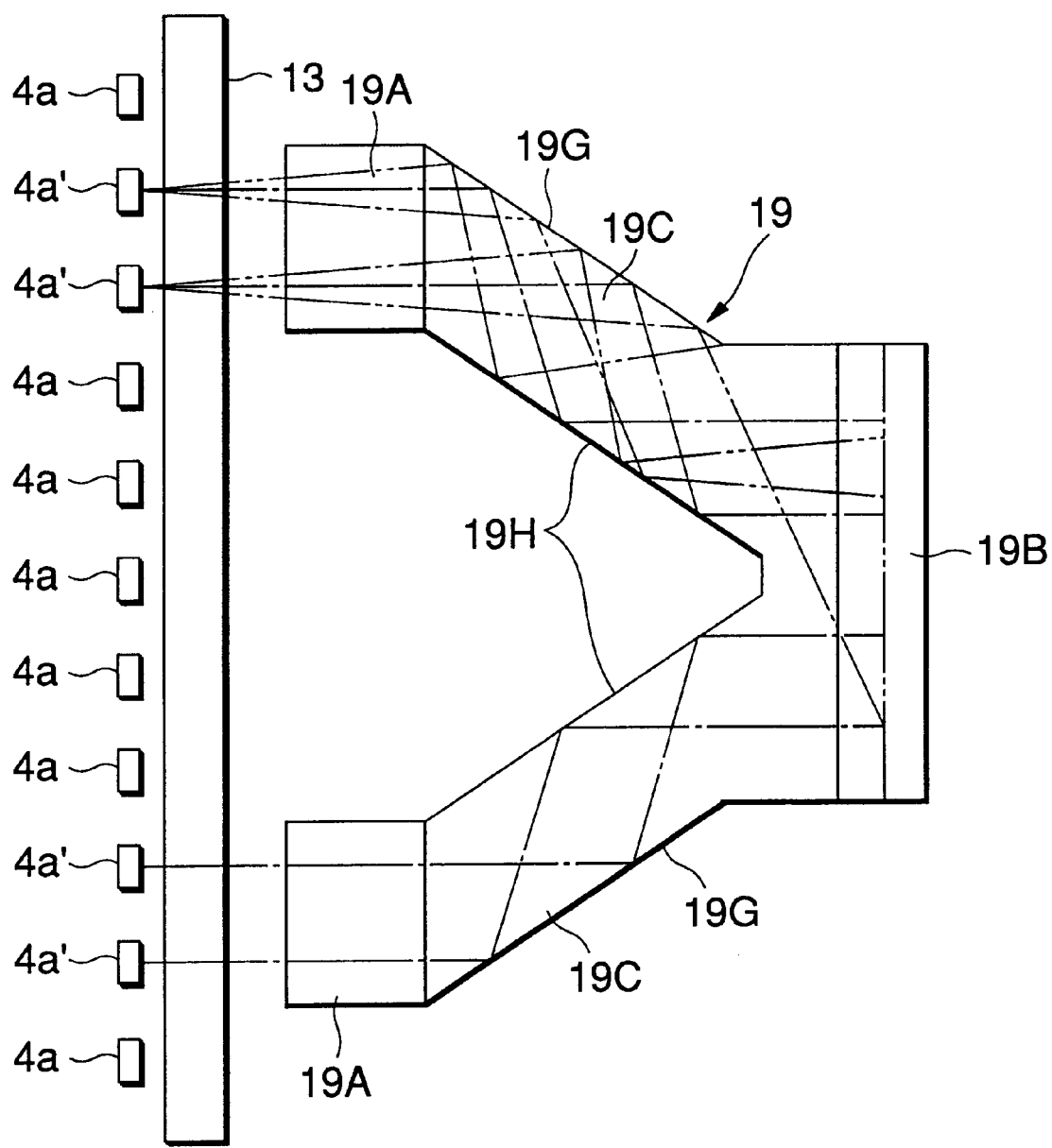
FIG. 4 is an enlarged view of a light guide plate shown in FIG. 3.

An illumination light guide plate 19 is disposed in the cover case 2. The plate guides the illumination light P to form a linear illuminated portion 18 on the transmission type reading object 7. As shown in FIGS. 3 and 4, the illumination light guide plate 19 has a Y-like shape in a plan view and is made of, for example, acrylic resin. The illumination light guide plate 19 is configured by: entrance portions 19A for the illumination light P emitted from the illumination system 4; an emission portion 19B which is disposed at a position separated from the entrance portions 19A in the conveying direction, and which emits the illumination light P toward the transmission type reading object 7; and light guide portions 19C through which the entrance portions 19A are optically connected to the emission portion 19B. A pair of the entrance portions 19A are provided. Each of the entrance portions 19A is provided with an entrance port 19D. The entrance ports 19D are separated from each other in the direction perpendicular to the conveying direction A and respectively positioned on both sides of the transmission type reading object 7. The emission portion 19B has an emission port 19E which is opposed to the slit opening 2B and elongates in the direction perpendicular to the conveying direction A and across the transmission type reading object 7.

Each of the paired entrance portions 19A has a total reflection face 19F which is opposed to the slit opening 2A and totally reflects the incident illumination light P. A pair of the light guide portions 19C are disposed. Each of the light guide portions 19C has total reflection faces 19G and 19H which totally reflect the illumination light P that has been totally reflected by the corresponding total reflection face 19F. When the illumination light guide plate 19 is formed from an acrylic resin material (having a refractive index of 1.49 at the d-line), the angle of total reflection of the material is 42 deg. and hence the total reflection faces 19F, 19G, and 19H are configured so that the angles of incidence of the illumination light incident on the total reflection faces 19F, 19G, and 19H are set to be 42 deg. or larger.

In the emission portion 19B, a total reflection face 19I is disposed which reflects the illumination light propagating through the paired light guide portions 19C, toward the emission port 19E. In the embodiment, the total reflection face 19I has a curved shape so that the illumination light P is concentrated to the linear illuminated portion 18 of the transmission type reading object 7. Alternatively, the total reflection face 19I may be a flat oblique face. A diffusing face is disposed in the emission port 19E in order to illuminate the linear illuminated portion 18 at even brightness.

The total reflection mirror 14 is placed directly below the slit opening 1A, and functions to guide reflected light P1 which has been reflected by the linear illuminated portion 12 of the reflection type reading object 6, to the imaging lens 16 via the half mirror 15. The half mirror 15 is placed directly below the slit opening 1B, and functions to reflect transmitted light P2 which has passed through the linear illuminated portion 18 of the transmission type reading object 7, toward the imaging lens 16. When information of the reflection type reading object 6 is to be read, the imaging lens 16 is positioned at a place indicated by the solid line so that the linear illuminated portion 12 and the one-dimensional line sensor 17 are placed at the conjugate positions, and, when information of the transmission type reading object 7 is to be read, the imaging lens is positioned at a place indicated by the broken line so that the linear illuminated portion 18 and the one-dimensional line sensor 17 are placed at the conjugate positions. A lens moving mechanism (not shown) which moves the imaging lens 16 is disposed in the body case 1.

When information of the reflection type reading object 6 is to be read, all the chip LEDs 4a are turned on, and, when information of the transmission type reading object 7 is to be read, only LEDs 4a' are turned on and the remaining LEDs 4a are turned off. This is conducted in order to prevent stray light as far as possible from being produced from illumination light which fails to enter the illumination light guide plate 19. The five LEDs 4a existing between the pairs of LEDs 4a' are not used because of the following reason. If illumination light emitted by these LEDs 4a is used, the illumination light may be colored when the light passes through the transmission type reading object 7 and then enter the illumination light guide plate 19.

As described above, the scanner of the invention is configured so that information of the whole face of a transmission type reading object is read by using only a linear-illumination light source for illuminating a reflection type reading object. Therefore, the invention attains an effect that the scanner can be compactly structured as a whole.

What is claimed is:

1. A scanner which comprises a body case and a cover case, and which can read information from a reflection type reading object on the basis of reflection of illumination light, and from a transmission type reading object on the basis of transmission of the illumination light, wherein said scanner further comprises:

a conveying mechanism for conveying the reflection type reading object and the transmission type reading object between said body case and said cover case in a predetermined direction;

an illumination system, disposed in said body case, for emitting the illumination light toward the reflection type reading object, and forming a first linear illuminated portion on the reflection type reading object, said linear illuminated portion linearly elongating in a direction perpendicular to the conveying direction;

an illumination light guide plate, disposed in said cover case, for guiding the illumination light emitted from said illumination system and forming a second linear illuminated portion on the transmission type reading object; and an image receiving system, disposed in said body case, for receiving images of said objects in said first and second linear illuminated portions;

wherein said illumination light guide plate is configured as a single optical member including:

an entrance portion for the illumination light emitted from said illumination system;

an emission portion which is disposed separated from said entrance portion in the conveying direction, and which emits the illumination light toward the transmission type reading object; and a light guide portion through which said entrance portion is optically connected to said emission portion.

2. A scanner according to claim 1, wherein said entrance portion has a pair of entrance ports which are separated from each other in the direction perpendicular to the conveying direction and respectively positioned on both sides of the transmission type reading object, and wherein said emission portion has an emission port which elongates in the direction perpendicular to the conveying direction and across the transmission type reading object.

3. A scanner according to claim 2, wherein said illumination light guide plate has a Y-like shape in a plan view.

4. A scanner according to claim 2, wherein a diffusing face is disposed in said emission port.

5. A scanner according to claim 2, wherein said illumination light guide plate propagates incident light entering through said entrance ports, to said emission port in accordance with the law of total reflection.

6. In a scanner capable of reading information from a reflection type object placed on a predetermined surface on the basis of reflection of illumination light emitted from an illumination system, a light guide plate is provided opposite from said illumination system with respect to said predetermined surface, said light guide plate comprising:

a light entrance portion facing said reflection type object having a first width when said reflection type object is placed on said predetermined surface, but not facing a light transmissible type object having a second width smaller than said first width when said light transmissible type object is place on said predetermined surface;

a light emission portion facing said light transmissible type object when said light transmissible type object is place on said predetermined surface; and a light guide portion optically connecting said light entrance portion to said light emission portion;

wherein (1) an optical intensity from a light source of said illumination system is changed between a first case where a transmission type image is to be read and a second case where a reflection type image is to be read, and (2) the position where the illumination light is emitted to the image is different between the first case and the second case.

7. In a scanner according to claim 6, wherein either of said light reflection type object and said light transmissible type object is moved along said predetermined surface when information is read therefrom.

8. In a scanner according to claim 6, wherein said illumination system forms a linear illuminated portion on said light reflection type object when information is read therefrom.

9. In a scanner according to claim 8, wherein said linear illuminated portion is fixed in position with respect to said predetermined surface.

10. In a scanner according to claim 6, wherein said illumination system in cooperation with said light guide plate forms a linear illuminated portion on said light transmissible type object when information is read therefrom.

11. In a scanner according to claim 10, wherein said linear illuminated portion is fixed in position with respect to said predetermined surface.

12. In a scanner according to claim 6, wherein said entrance portion includes a pair of entrance ports located opposite from each other with respect to said light transmissible type object when said light transmissible type object is placed on said predetermined surface.

13. In a scanner according to claim 6, wherein said light guide plate has a substantially Y-shape in a plane view.

14. In a scanner according to claim 6, wherein said guide plate further comprises:

a first total reflection face between said entrance portion and said guide portion; and a second total reflection face between said guide portion and said emission portion.

15. In a scanner according to claim 14, wherein said second total reflection face is planer.

16. In a scanner according to claim 14, wherein said second total reflection face is curved.

17. In a scanner according to claim 6, wherein a diffusing face is provided in said emission port.

* * * * *